(No Model.) 8 Sheets—Sheet 1.

J. W. MEAKER.
FARE REGISTER.

No. 397,601. Patented Feb. 12, 1889.

Fig. 1.

Witnesses:
Albert N. Adams.
Henry T. Jones.

Inventor:
John W. Meaker (No Model.) 8 Sheets—Sheet 4.
J. W. MEAKER.
FARE REGISTER.

No. 397,601. Patented Feb. 12, 1889.

Witnesses
Albert H. Adams.
Harry T. Jones.

Inventor
John W. Meaker (No Model.) 8 Sheets—Sheet 5.
J. W. MEAKER.
FARE REGISTER.

No. 397,601. Patented Feb. 12, 1889.

Witnesses:
Albert H. Adams.
Harry T. Jones.

Inventor
John W. Meaker

(No Model.) 8 Sheets—Sheet 8.

J. W. MEAKER.
FARE REGISTER.

No. 397,601. Patented Feb. 12, 1889.

Witnesses:
Albert H. Adams
Harry T. Jones

Inventor:
John W. Meaker

UNITED STATES PATENT OFFICE.

JOHN W. MEAKER, OF CHICAGO, ILLINOIS, ASSIGNOR TO THE RAILWAY REGISTER COMPANY, OF SAME PLACE.

FARE-REGISTER.

SPECIFICATION forming part of Letters Patent No. 397,601, dated February 12, 1889.

Application filed January 19, 1888. Serial No. 261,229. (No model.)

*To all whom it may concern:*

Be it known that I, JOHN W. MEAKER, residing at Chicago, in the county of Cook and State of Illinois, and a citizen of the United States, have invented certain new and useful Improvements in Fare-Registers, of which the following is a specification, reference being had to the accompanying drawings, in which—

This invention relates to improvements in fare-registers of that class primarily designed to be secured in a street-car for the purpose of registering the collected fares, but which can be used in other places.

The object of the invention is to improve the mechanism by which a series of chains, each having numerals thereon, are advanced continuously to indicate the number of fares taken, such chains being divided to have one series form a total-register and another a trip-register, the chains of both registers being simultaneously advanced by the action of the main pull, and the chains of the trip-register being capable of resetting without affecting the chains of the total-register; and the nature of the invention consists of the several parts and combinations of parts hereinafter described, and pointed out in the claims as new.

In the drawings, 1 represents a case having a bottom and side and end walls with an interior of a dimension to receive the registering devices, and, as shown, the end 2 of this case is thickened or strengthened to receive the effects of the return of the upper main pull. A face-plate, 3, is provided to fit the case, which plate, as shown, has a raised or struck-up portion, *a*, in which is formed a sight-opening, 4, for the observation of the total-register and a sight-opening, 5, for observing the trip-register, and with slots 6 for the passage of a key for operating the slide or covering for the sight-opening 4. As shown, the sight-opening 4 is formed by a depression, *b*, to receive a glass, *d*, and a matting, *e*, with cross-bars *f*, and the sight-opening 5 is formed by a depression, *c*, to receive a glass, *g*, and a matting, *h*, with a cross-bar, *i*; but the face-plate and the sight-openings therein can be formed in any suitable manner.

Figure 3:
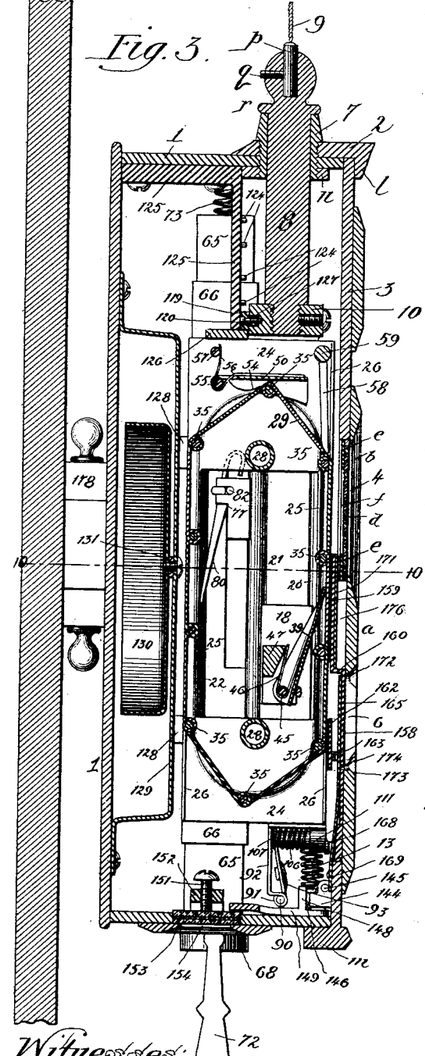
Fig. 3 is a section on line 3 3 of Fig. 2.
Figure 4:
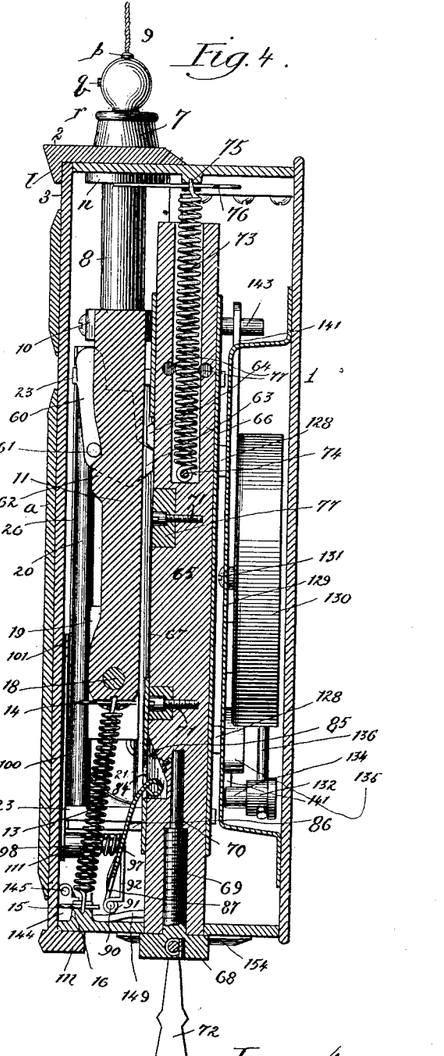
Fig. 4 is a section on line 4 4 of Fig. 2.
Figures 27, 28, 29, 30, 31:
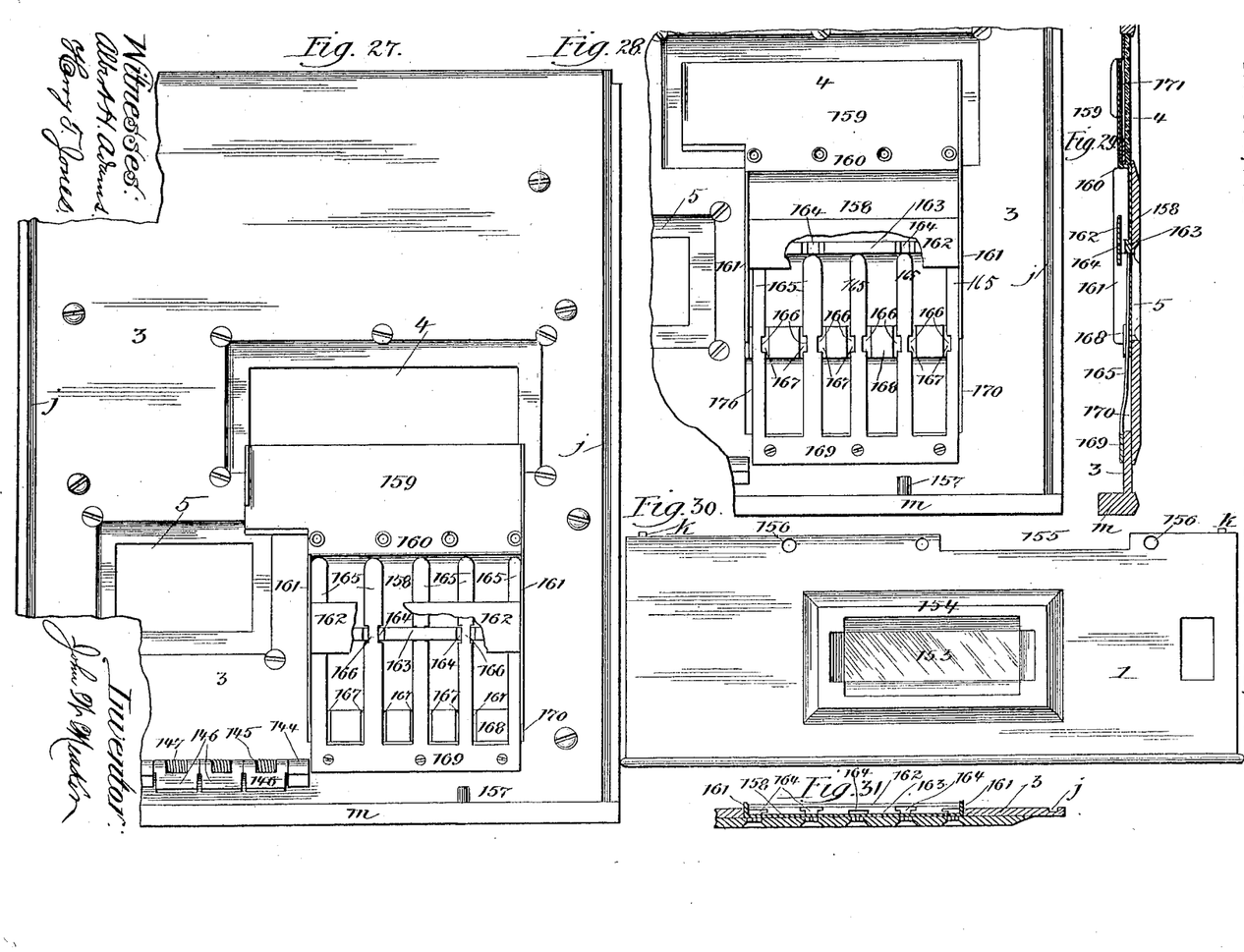
Fig. 27 is an inside view of the face-plate, showing the sliding plate for the main register sight-opening and its lock open.
Fig. 28 is a similar view showing the sliding plate closed.
Fig. 29 is a section of the face-plate with the parts as in Fig. 28.
Fig. 30 is an end view of the case, showing the seal and the opening for the passage of the locking-catches when raised.
Fig. 31 is a cross-section of the covering-plate for the main register, showing the locking-bars.

The side walls of the case project to form a portion, *k*, Fig. 30, which enters grooves *j*, formed in the face-plate 3, Figs. 27, 28, and 31, and the face-plate when in position passes beneath the lip *l* of the upper end, 2, and at its other end has a projecting portion or lip, *m*, to abut against the bottom end wall of the case when the face-plate is closed, Figs. 3 and 4.

Figure 2:
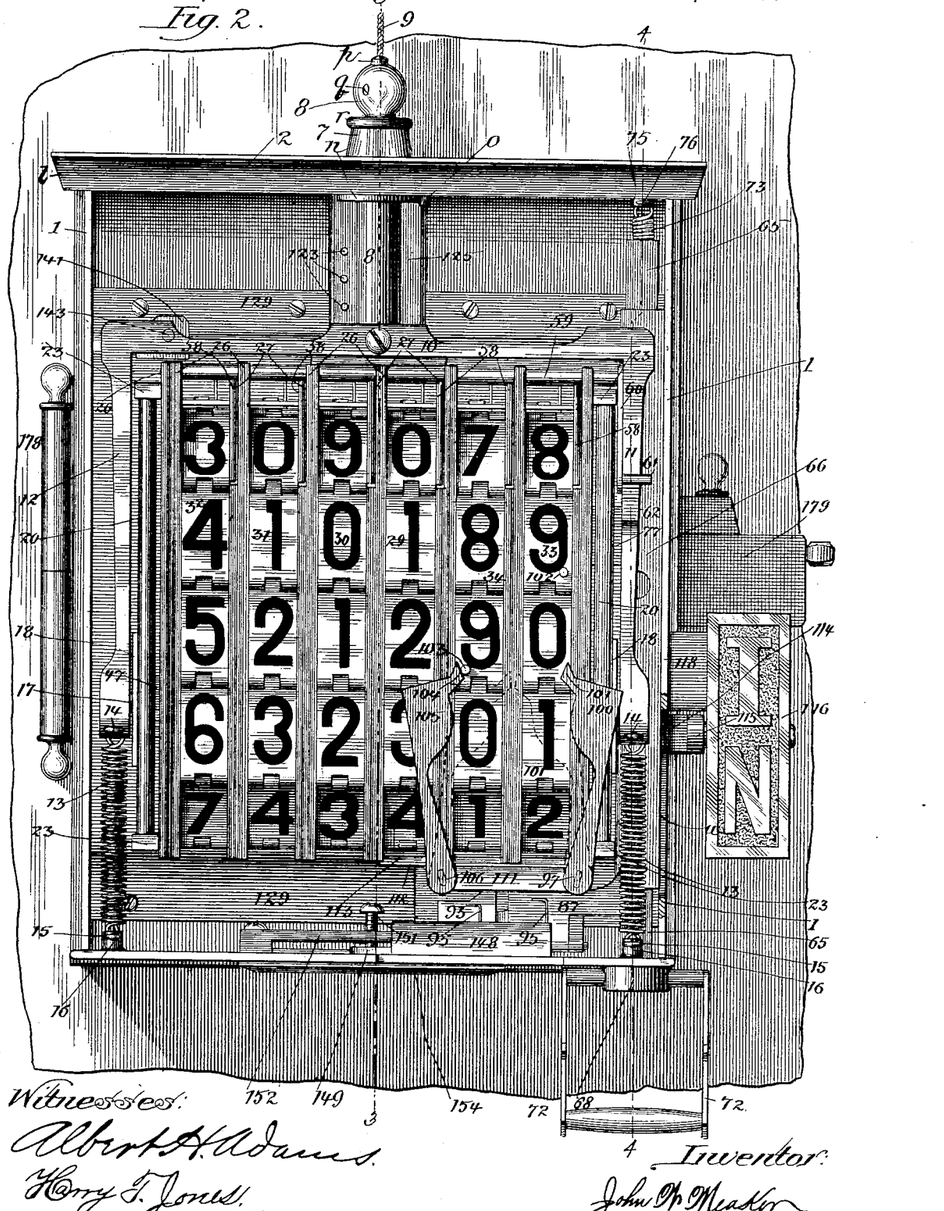
Fig. 2 is a front elevation with the face-plate removed and one of the side walls partly broken out to show the slot for the bar which carries the direction-indicator.

The end plate, 2, has screw-threaded thereinto a bushing, 7, which bushing, as shown, is held in place by a jam-nut, *n*, locked by a screw, *o*, Fig. 2, against turning. The bushing 7 forms a guide and bearing for a stem, 8, to which stem is secured, by a plug, *p*, and a set-screw, *q*, a pull-cord, 9, running through the car, and, as shown, the stem 8 has a bead, *r*, for contact with the end of the bushing 7 to limit the inward movement of the stem 8.

A pull or cross bar, 10, is secured to the inner end of the stem 8 in any firm manner, and this bar at one end has an arm, 11, and at the other end an arm, 12, which arms extend downward alongside of the registering mechanism, as shown in Fig. 2, and each arm has secured thereto a spring, 13, the arm end of each spring having an eye or loop to enter a slot in the end of the arm and be there secured by a pin, 14, and each spring at the other end is secured by a pin, 15, to a stud, 16, on the end wall of the case, the stud having a slot to receive the end loop of the spring, through which loop the pin 15 passes, and these pins 14 and 15 can have an eye or head to abut against the inside of the face-plate to hold the pins securely in place.

Figures 32, 33, 34, 35, 36:
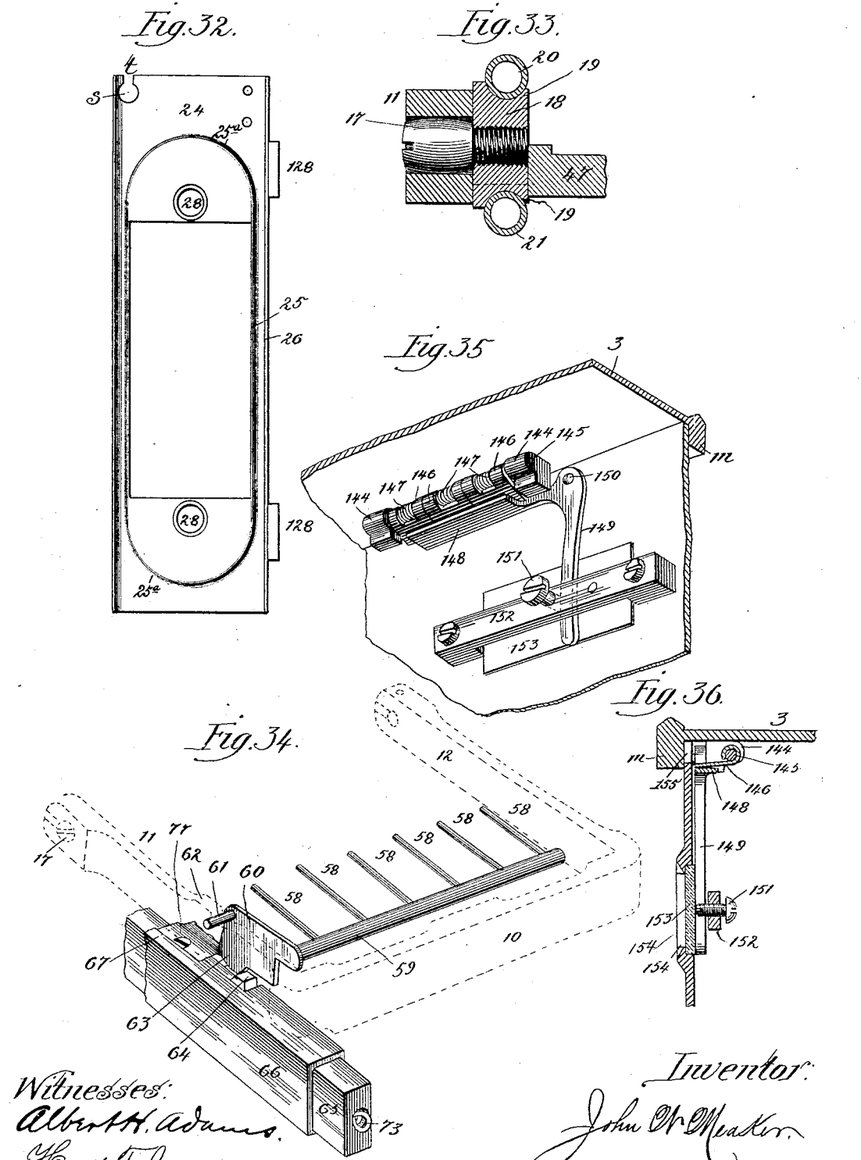
Fig. 32 is an end view of a frame for the registering-chains.
Fig. 33 is a detail, partly in section, showing the connecting-pin between the main pull and the slides which carry the bar for the actuating-pawls.
Fig. 34 is a perspective view showing the locking-fingers for the registering-chains and the means for giving the fingers a vibratory movement.
Fig. 35 is a perspective of the locking device for securing the face-plate against withdrawal.
Fig. 36 is a detail in section of the parts shown in Fig. 35.

Each arm 11 and 12 at its lower end has a pin, 17, which tapers in both directions from the center, as shown in Fig. 33, to allow a freedom of movement that will prevent any cramping or binding of the arms in use. Each pin 17 is screw-threaded at one end to enter a sliding block, 18, the inner corners of which are grooved to form a bearing-face, 19, as shown in Figs. 10 and 33, and these bearing-faces 19 fit against round tubes 20 and 21, which tubes form the track for the sliding block to work on, and, as shown, a third tube, 22, is provided for strength. Three of these tubes are provided on each side, and each tube at each end is secured into a post, 23. The middle tube, 21, as shown, Fig. 6, is secured by set-screws, and all of the posts can be secured to the ends of all the tubes by such set-screws or in any other suitable manner.

Figure 5:
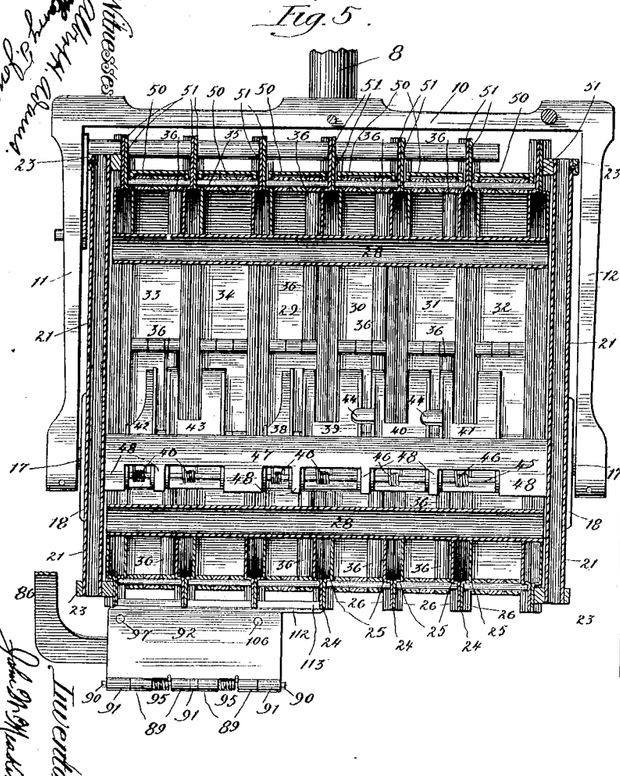
Fig. 5 is a sectional elevation of the registering devices.
Figure 6:
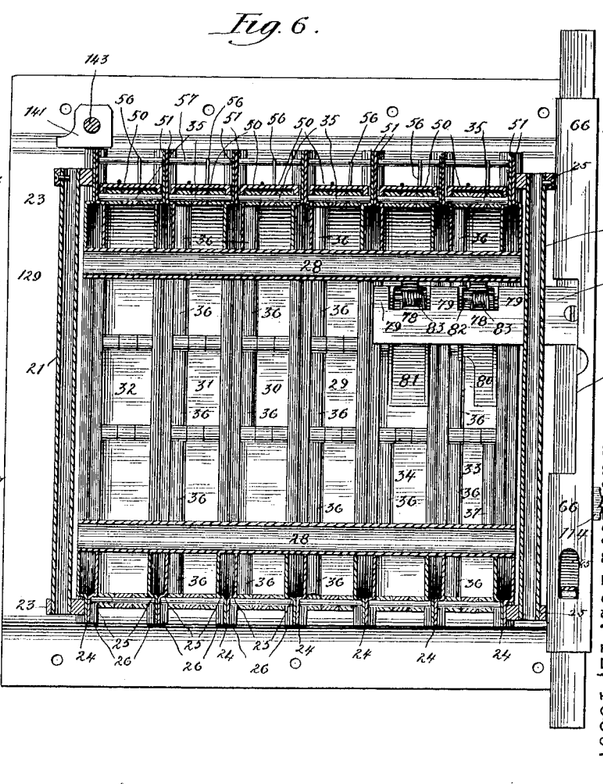
Fig. 6 is a sectional elevation of the registering devices, showing the resetting mechanism for the trip-register.
Figures 7, 8, 9, 10:
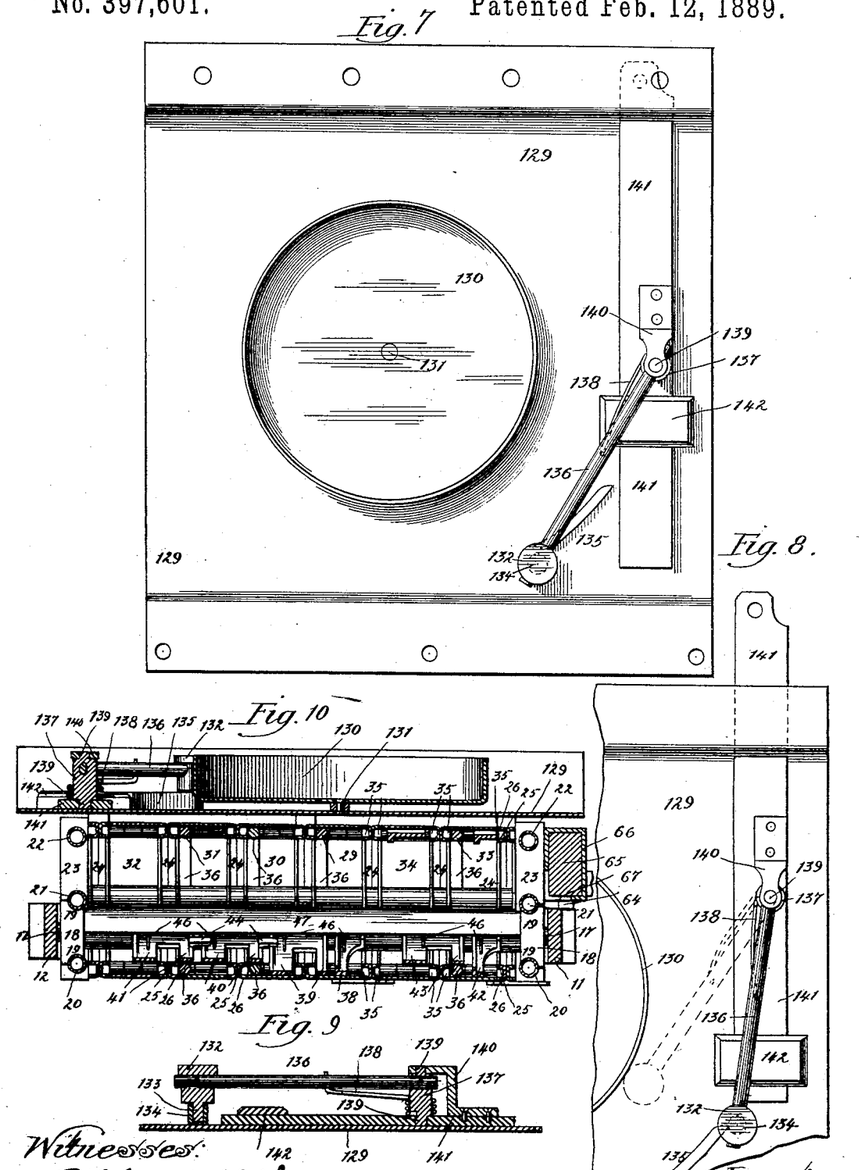
Fig. 7 is a face view of the bell and its hammer.
Fig. 8 is a detail of the bell-hammer in position to leave the cam and strike the blow.
Fig. 9 is a section through the bell-hammer and its carrying-bar.
Fig. 10 is a cross-section on line 10 10 of Fig. 3.

The track or frame for the register-chains is formed of a series of plates, 24, each having an inner flange, 25, and an outer flange, 26, Figs. 3 and 32, to form between them a pathway of travel for the pivot-pins of the chain-link, and the frame, as a whole, is formed by setting the required number of these plates back to back, as shown in Figs. 5 and 6, and securing them to a top and a bottom tube, 28, as shown in Figs. 3, 2, 5, 6, and 32, and the outer flange, 26, of one plate, when the two plates are together, is cut away at one end to leave an opening, 27, for the location and operation of the stop-fingers, as shown in Fig. 2.

The units-chain 29, tens-chain 30, hundreds-chain 31, and thousands-chain 32 of the total-register and the units-chain 33 and tens-chain 34 of the trip-register are each made of ten links, each link having a numeral thereon, the numerals running from zero to nine, both inclusive, and each link is secured to its adjoining link by a pivot-pin, 35, each end of which projects beyond the link to enter the guide or track way between the flanges 25 and 26, Figs. 3, 5, 6, 10, and 16, to furnish the means for supporting and guiding the respective chains, and, as shown, the plates 24 are each cut away to leave an open center, and at each end of the opening each plate is formed with a curve, 25ª, to furnish the track for the travel of the chain at each end. (See Fig. 32.)

The units, tens, and hundreds chains 29, 30, and 31 each have the cipher-link left camless, which I will hereinafter term "blank," meaning thereby that the link referred to has no cam. The remaining links are provided with a cam, 36, Figs. 5 and 6, and, as shown, the chain 32 is formed of all blank links. The chain 33 has on the inner face of the links having the numerals 0, 1, 2, 3, 5, 6, 7, and 9 a single cam, 36, and the chain-link having the numeral 4 thereon has an additional cam, 37, making a double cam for this link, and the link with the numeral 8 thereon is blank, and in addition to the single cam on the link with the numeral 9 the front face of such link carries the pin 102 for moving the canceler back. The chain 34 of the trip-register has the links with the numerals 0, 1, 2, 3, 5, 6, 7, 8, and 9 left blank on their inner faces, and the link with the numeral 4 provided with a single cam, 36, and the link with the numeral 9 on its front face has a pin for moving back the canceler of this chain. The cams 36 for the chains 29, 30, and 31 are on the inner face of the respective links.

The chains 29, 30, 31, and 32 are advanced one link at a time, as required, by the action of the pawls 38, 39, 40, and 41, Figs. 5 and 10, the pawl 38 advancing the chain 29 with each pull one link, and when the tenth pull is had the chain 29 and the chain 30 will each be advanced one link by the action of the pawls 38 and 39, and when the tens-chain has made a complete revolution the three chains 29, 30, and 31 will be advanced each one link by the action of their respective pawls 38, 39, and 40, and so on for the succeeding chains. The pawl 39 is held non-acting, except at the completion of a revolution of the chain 29, by the end of the pawl resting on the cams 36 of the links of the chain 29 until the blank link of such chain comes beneath the end of the pawl 39, allowing it to drop and advance the chain 30 one link with the advance of the blank link of the chain 29, and at the completion of such advance the pawl 39 again rides on the cams 36 of the chain 29, and the pawl 40 is held out of engagement by resting on the cam 36 of the chain 30 until such chain is brought to a position for its blank link to be beneath the pawl 40, which would occur with the presentation of the number 90 by the units and tens chains 29 and 30, so that with the next advance of the chain 29 the chain 31 would be advanced by the pawl 40 if no means were provided for holding this pawl out of action while the blank link of the chain 30 is beneath its end, and this is done by the ear 44 of the pawl 40, which projects over and rests upon the pawl 39, which pawl is held out of action by the cams 36 of the chain 29 until the blank space or link of such chain comes into position for the pawl 39 to drop, which allows the pawl 40 to also drop, Fig. 5, so that with the next advance all three pawls will act and advance the chains 29, 30, and 31 simultaneously one link, and with such advance the pawls 39 and 40 will ride, respectively, upon the cams 36 of the chains 29 and 30 until another complete revolution of the chain 30 is had, bringing the blank link of the chain 30 beneath the pawl 40, when the pawl 40 will be held up for one revolution of the units-chain by the ear 44 and the riding of the pawl 39 on the cams 36 of the units-chain, as just described, and so on for each count of a hundred. The pawl 41 for the chain 32 will be held out of engagement by the action of the cam 36 of the chain 31 until the blank link of the chain 31 is below the end of the pawl, at which time the pawl 41 will be held out of engagement by the ear 44 for such pawl resting on the pawl 40, and as this pawl is held out of engagement partly by the ear 44 and the pawl 39 and partly by the cams 36 of the chain 30 during the period that the blank link of the chain 31 is beneath the pawl 41, such pawl cannot drop until the blanks of the chains 29, 30, and 31 are in line, allowing the pawls 39, 40, and 41 to drop and advance the chains 29, 30, and 31 simultaneously one link, showing the number 1,000.

The pawl 38 is always acting to advance the chain 29 one link at a time with each operation of the main pull 10, and during the advance the pawl 39 is held up by the cams 36 of the chain 29 until the blank link of the chain 29 comes beneath the pawl 39, when both pawls 38 and 39 act and advance the chains 29 and 30 simultaneously one link, and the pawl 40 is non-acting until the blank link of the chain 30 is beneath it by riding on the cams 36 of the other links of the chain 30, and when the blank link is beneath the pawl 40 such pawl is held out of engagement until the proper time for the advance of the chain 31 by the ear 44, pawl 39, and cams 36 of the chain 29, and the pawl 41 is held out of engagement with the chain 32 by riding on the cams 36 of the chain 31 until the blank link of the chain 31 is beneath it, when it is held out of engagement by the action of its ear 44, the pawl 40, cams 36 of chain 30, ear 44 of pawl 40, pawl 39, and cams 36 of the chain 29, by which arrangement one pawl assists in holding another during the period a blank space is beneath a pawl, which space must be bridged in order to advance the chain correctly.

Figures 11, 12, 13, 14, 15, 16, 17, 18, 19, 20, 21, 22, 23, 24, 25, 26:
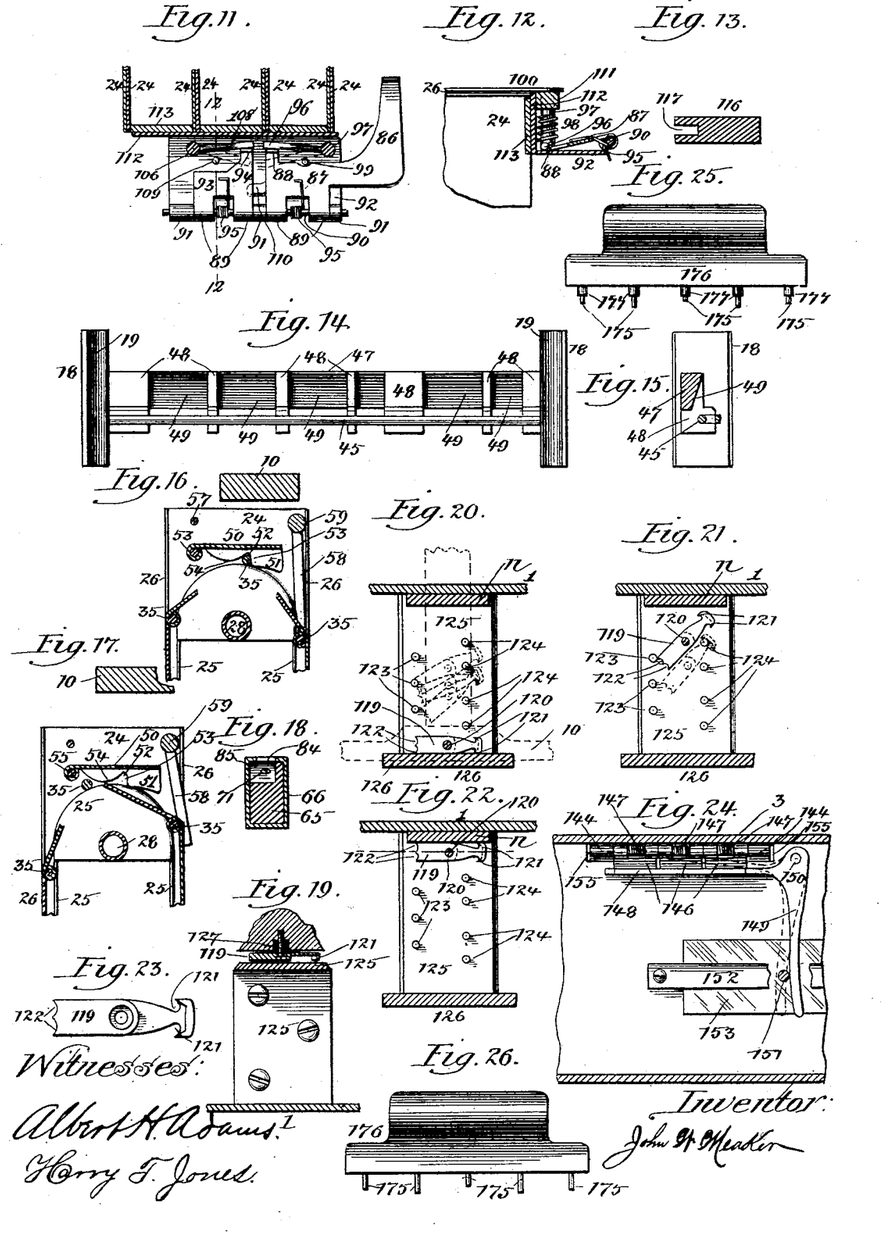
Fig. 11 is a plan view, partly in section, of the devices for operating the canceler.
Fig. 12 is a section on line 12 12 of Fig. 11.
Fig. 13 is a cross-section of the direction-indicator plate.
Fig. 14 is an elevation of the bar carrying the pawls for advancing the chains in making a registration.
Fig. 15 is a cross-section of the bar of Fig. 14.
Figs. 16 and 17 are details in section, showing the stop-latches and stop-fingers for the registering-chains.
Fig. 18 is a detail in section of the resetting-bar for the trip-register and its casing or tube, showing the incline on the bar for operating the arm of the units-canceler.
Fig. 19 is a detail in section of the locking-dog.
Figs. 20, 21, and 22 are details showing different positions of the locking-dog in the movement of the main pull.
Fig. 23 is a detail showing the locking-dog.
Fig. 24 is a detail showing the locking-catches and the lifting device therefor for securing the face-plate against removal.
Fig. 25 is a detail of the key for locking the covering-plate of the main register in either its open or closed position.
Fig. 26 is a detail for locking the covering-plate of the main register open.

The pawl 42 for the chain 33 of the trip-register, like the pawl 38, is always acting to advance the chain 33 one link with each operation of the main pull 10, and the pawl 43 is by the cam 36 on the links of the chain 33 held out of engagement with its chain 34 until the chain 33 has made a revolution and its blank link comes below the pawl 43, and when the blank link of the chain 33 comes below the pawl 43 both pawls 42 and 43 will act and advance the chains 33 and 34 simultaneously one link, and this action will occur with each complete revolution of the chain 33 and in unison with the advance of the chains of the total-register, as both registers are operated from the same pull formed by the bar 10, the arms 11 and 12, and the sliding block 18, to which block is secured the bar 47, which carries the several pawls 38, 39, 40, 41, 42, and 43. The bar 47 is divided into recesses 49 for the reception of the several cams by division-walls 48, arranged as shown in Fig. 14, and the bar for each recess 49 is cut away to leave an inclined face, as shown in Fig. 15, to allow the pawls to drop, and the several pawls are pivotally supported by a wire or pivot, 45, running from the ear or wall at each end of the bar across the bar, and each pawl is thrown down by the action of a spring, 46, one arm of which bears against the face of the pawl and the other against the face of the bar 47 in each recess 49, as shown in Figs. 3, 5, and 10. The pawls being all carried by this same bar, 47, it follows that each movement of the bar 47 from the pull-bar 10 will advance and recede the pawls, and the distance advanced is one sufficient to advance the registering-chains by the action of their respective pawls one link at a time, and the receding movement is one that will allow the pawls to return the distance advanced and fall back of the hinge for the next succeeding link to be advanced.

Each chain is held against a return after each advance by a catch, 50, (see Figs. 3, 16, and 17,) formed of a plate having at each side a flange, 51, in which is a notch, 52, having a straight face, 53, to engage with the projecting end of the pivots 35 of the chains as they come in line with the notch 52, and each notch on its rear side has a curved face, 54, to allow the pivot end to readily pass from the notch with the advance of the chain; but a return of the chain is prevented by the contact of the end of the pin 35 with the straight wall 53. Each advance of the chain will raise the catch 50 by the action of the end of the pin 35 on the curved wall 54, allowing the pin, which has been caught, to pass from beneath the catch, and after the pin has passed from the catch the catch is returned by the action of a spring, 56, coiled around the wire 55, which carries the catches 50, to have one arm bear against the catch and the other against a cross-wire, 57, which wire, as well as the wire 55, runs across the chain-frame 24, in which frame both wires are suitably secured, and, as shown, the under edge of each flange 51 is curved slightly to allow the pivot ends to pass readily on the advance of the chain.

Each chain is stopped after each advance by the action of a stop-finger, 58, and these fingers 58 are secured to a rock-shaft or rod, 59, which has its bearings in the plates 24 of the chain-frame, Fig. 3, and, as shown, the rock-shaft or rod 59, with its fingers 58, is slipped into place by forming a hole, s, in the plates, with an opening, t, Fig. 32, to allow the fingers to pass, and when in position the rock-shaft or rod 59 is turned to drop the fingers 58 in position to engage the pins or pivots 35, the fingers 58 working in the cut-away space 27 of the flanges 26. The rock-shaft at its outer end has secured thereto an arm, 60, Fig. 34, projecting out from the end of which is a pin, 61, with which pin a cam, 62, on the arm 11 comes in contact on the movement of the arm from the pull-bar 10, causing the pin 61 to ride over the cam 62 and by such action raise the arm 60 and rock the shaft 59 to raise the fingers 58 from engagement with the pin 35, allowing the chain which is being advanced to be released to permit the advance, and on the return of the arm 11 the pin 61 again rides over the cam 62, raising the arm 60 to rock the rod 59 and raise the fingers 58, thus raising the fingers and again dropping them after the pin 61 passes the cam 62 to have their ends engage the pivots 35 and stop any advance of the chains until released by the pin 61 and cam 62 with the outward movement of the arm 11. The pin 61 and the cam 62 are in such relation to each other and the movement of the arm 11 to advance the actuating-pawls of the chains that at the first start of the arm the pin will ride upon the cam, raising the fingers 58, leaving the chains free for the advance, and when the arm 11 returns to its normal position the pin 61 drops, as shown in Fig. 4, for the fingers 58 to lock the chains.

The arm 60 at its end has a cam, 63, which coacts with a cam, 64, on the pull-bar 65 for resetting the trip-register, by which cams the arm 60 will be raised to rock the shaft or rod 59 and raise the fingers 58 to release the trip-chain for the advance in resetting them. The cams 63 and 64 are in such relation to each other that at the beginning of the outward pull of the resetting-bar 65 the cam 63 will ride over the cam 64, raising the arm 60 and rocking the shaft 59 to release the fingers 58 from engagement with the trip-chains, leaving such chains to be advanced by the resetting-pawls. The bar 65 is of a rectangular shape in cross-section, as shown in Figs. 10 and 34, and is located in a shell or tubing, 66, so as to be free to slide back and forth, and this shell or tube 66 has a cut-away portion, 67, to leave a passage for the travel of the cam 64. The lower end of the bar 65 has attached thereto a head, 68, by a screw-stem, 69, and this head 68, when the parts are together, lies outside of the end of the case 1, and, as shown, the stem 69 has a continuation, 70, of a smaller diameter, against which is set the end of a screw, 71, in the bar 65, which screw forms a lock against the removal of the stem 69 until the end of the screw 71 is released from its engagement with the stem portion 70. The head 68 has pivoted or otherwise secured thereto a handle, 72, by which the bar 65 is moved downward, and, as shown, the upper end of the bar 65 has a hole, in which is located a spring, 73, the inner end of the spring having a loop or eye, through which is passed a pin, 74, secured in the bar 65, by which the spring is locked to the bar, and the other end of the spring 73 has a loop or eye to enter a slot in a stud, 75, on the end 2 of the case, through which stud and the loop or eye of the spring a pin, 76, is passed, securing the spring to the stud, and this spring 73 acts to return the bar 65 after each downward pull thereof.

The bar 65 has secured thereto in any firm manner a bar, 77, which bar projects into the frame of the chains the distance of the space occupied by the chains of the trip-register, and this bar 77 moves in the opening formed by the cut-out portion of the frame-pieces 24, as does also the bar 47, Fig. 3. The bar 77 is provided with recesses 78, with inclined faces, similar in this respect to the recesses 49 of the bar 47, and these recesses 78 are formed by a wall at each end and a division-wall, 79, and in the recesses are located the pawls 80 and 81, Fig. 6, for the trip-registering chains 33 and 34, for resetting these chains. These pawls are mounted upon the common pivot-wire, 82, secured in the end walls of the recesses, and around the wire 82 is coiled a spring, 83, one for each pawl 80 and 81, each spring having an arm to bear against its pawl and an arm to bear against the face of the bar 77 in each recess 78. The pawls 80 and 81 are located and operate on the opposite side of the chains from the pawls 38 to 43, inclusive, which advance the chains, as shown in Fig. 3, and these pawls 80 and 81 act to move the trip-chains in the same direction as do the actuating-pawls 38 to 43 of such chains, so that the chains for the trip will have an advance both in registering and in being reset, by which arrangement the retaining-latches 50 and the stop or locking fingers 58 remain the same whether the chains are advanced for a registration or for resetting, and their operation is the same in both cases.

The pawl 81 engages with the links of the chain 34 until the link of the chain 34 which has the cam 36 comes beneath the end of the pawl 81, allowing the pawl to ride and cease to advance the chain 34, and when the double cam-link of the chain 33 is beneath the pawl 80 the pawl 80 is non-acting, as its end rests upon and rides over the cam 37 of the chain 33 with each advance and return of the pull-bar 65, until which time the chain 33 is advanced by the engagement of the pawl 80 with the chain, and the pawls 80 and 81 continue to advance their chains 33 and 34 until the links of the chains having the cams thereon come beneath the end of the respective pawls to have the pawl ride thereover with the advance and return of the pull-bar 65, at which time both chains are in position to display the cipher at the sight-opening, and when both chains are in this position no advance of either chain can be had from the resetting-pawls 80 and 81, because both pawls are held out of action by the cams 37 and 36 of the chains 33 and 34, thus preventing a further advance of the trip-chains beyond the links, displaying the ciphers by the continued movement of the pull-bar 65. The chains 33 and 34 are advanced, after being reset or at any period, by the pawls 42 and 43 with the action of the pull-bar 10 and in unison with the chains of the total-register; but in resetting the trip-chains such chains only will be advanced, as the resetting-pawls 80 and 81 have no action on the chains of the total-register.

The tube 66 has cut in one of its walls a slot, 84, Fig. 6, which is in line with the travel of the inclined face 85 of the pull-bar 65, and into this slot 84 projects the end of an arm, 86, which arm is a part of or secured to a plate, 87, which plate has an extension with a turned end, forming a stop, 88. This plate 87 is provided with ears 89 to receive a pivot, 90, secured in ears 91 of a supporting-plate, 92, and adjacent to the plate 87 is a plate, 93, having an extension with a turned-up end, forming a stop, 94, which plate also has ears 89 to receive the pivot 96, and each plate 87 and 93 is held down by the action of the arm of a spring, 95, coiled around the pivot 90, each spring having an arm to engage the plate or support 92, and the plate 87 has a side extension or ear, 110, coming beneath the plate 93, by which the plate 93 is raised, the plate 87 being raised by the action of the incline 85 on the end of the arm 86. The stop 88, when the plate 87 is down, engages the outer end of an arm or rod, 96, extending out from a shaft, 97, around which shaft is a coiled spring, 98, which acts to turn the shaft when the stop 88 is disengaged from the arm 96, and this shaft 98 at each end has a journal by which it is pivotally supported, and the limit of movement of the arm 96 when released from the stop 88 is held by a stop-pin, 99, projecting from the plate 92. The journals of the shaft 97 enter suitable bearings therefor in the plate 92 and a supporting-bar, 111, and the journal for the bar 111 extends beyond the bar, and its end is square-faced at the sides to receive and hold a canceler, 100, having at its outer end a stop, 101, to engage with the stop-pin 102 on the link of the units-chain 33 of the trip-register having the numeral 9 thereon. The link having the numeral 9 thereon of the tens-chain of the trip-register has thereon a stop-pin, 103, to engage with the stop end 104 of a canceler, 105, secured to the projecting end of a shaft, 106, corresponding to the shaft 97, and having coiled around it a spring, 107, and this shaft 106 has an arm, 108, to engage the end 94 when the plate 93 is down, and the limit of movement of the arm 108 when released from the stop end 94 is held by a stop-pin, 109, from the plate or support 92. The plate 92 is secured in position by having a portion, 112, bent at right angles and secured by screws or otherwise to a plate, 113, attached in any firm manner to the frame-plates 24 at the end, and to the plate 113 is secured the bar 111. The shafts 97 and 106 are secured in place by first placing their ends in the plate 92 and then slipping the bar 111 over the journals of the shaft and securing the bar to the plate 112.

The canceler 100 coacts with the chain 33, and the canceler 105 coacts with the chain 34, and these cancelers are both non-acting when, in resetting, the chains 33 and 34 display the ciphers at the sight-opening 5; but, in case the chains are reset only partly, the cancelers cross the respective chains, showing that the resetting operation has not been completed. Each canceler is held back when the ciphers of their respective chains are at the sight-opening by the engagement of the stop-pins 102 and 103 with the stops 101 and 104, and when the cancelers are back and the pull-bar 65 is at rest the cancelers are held back by the engagement of the arms 96 and 108 with the stops 88 and 94 of the plates 87 and 93, respectively, and when the plates 87 and 93 are in position to hold the arms 96 and 108 the end of the arm 86 lies within the recess 84 at the bottom of the incline 85, so that the parts are non-acting.

The downward movement of the pull-bar 65 to commence the resetting of the trip-chains causes the incline 85 to act and raise the arm 86, raising the plate 87 and releasing the stop 88 from the arm 96, which releases the coiled spring and turns the shaft 97 by the action of the coiled spring 98, throwing the canceler 100 across the face of the units-chain, where it will remain until such chain has been advanced to have the stop-pin 102 engage the canceler and move it back until the stop 101 thereof engages with the stop-pin 102 to hold the canceler 100 out of use, at which time the cipher of the units-chain is at the sight-opening, and if the units-chain only has been advanced the canceler 105 will not come into use, as it is held back by the engagement of its stop 104 with the stop-pin 103 of the chain 34; but if both chains 33 and 34 have been advanced the canceler 105 will be thrown across the chain 34 simultaneously with the throwing across of the canceler 100 of the chain 33, as the lifting of the plate 87 by the arm 86 will, through the ear 110, raise the plate 93, releasing the stop 94 from the arm 108, allowing the coiled spring 107 to turn the shaft 106 and throw the canceler 105 across the chain 34, and such canceler 105 will remain across the chain 34 until removed by the action of the stop-pin 103 engaging the canceler and moving it back to be caught and held by the engagement of the stop 104 with the pin 103, at which time the cipher of the chain 34 will be at the sight-opening. The return of the cancelers by their stop-pins occurs when the ciphers of the chains 33 and 34 are at the sight-opening, at which time the pawls 80 and 81, which advance the chains 33 and 34, become non-acting by their ends riding on the cams 37 and 36 of the chains 33 and 34, as already described, and when the cancelers are held back by the stop-pins 102 and 103 the rods or arms 106 and 108 are turned to allow the stops 88 and 94 to drop back of them, when the plates drop by the dropping of the arm 86 into the slot 84 at the foot of the incline 85 when the bar 65 is at rest, and if the bar 65 is moved after the chains are reset such movement will not affect the cancelers, as they are held back by their stop-pins 102 and 103, holding the arms 96 and 108, so that the lifting of the arm 86 will simply raise the plates 87 and 93 without any release of the cancelers, the stops 88 and 94 moving without any release of the arms 96 and 108 occurring. The advance of the chains 33 and 34 carries the stop-pins 102 and 103 away from the stop-ends 101 and 104, leaving the cancelers free to be thrown in when the arms 96 and 108 are released from the stops 88 and 94, as already described.

Figure 1:
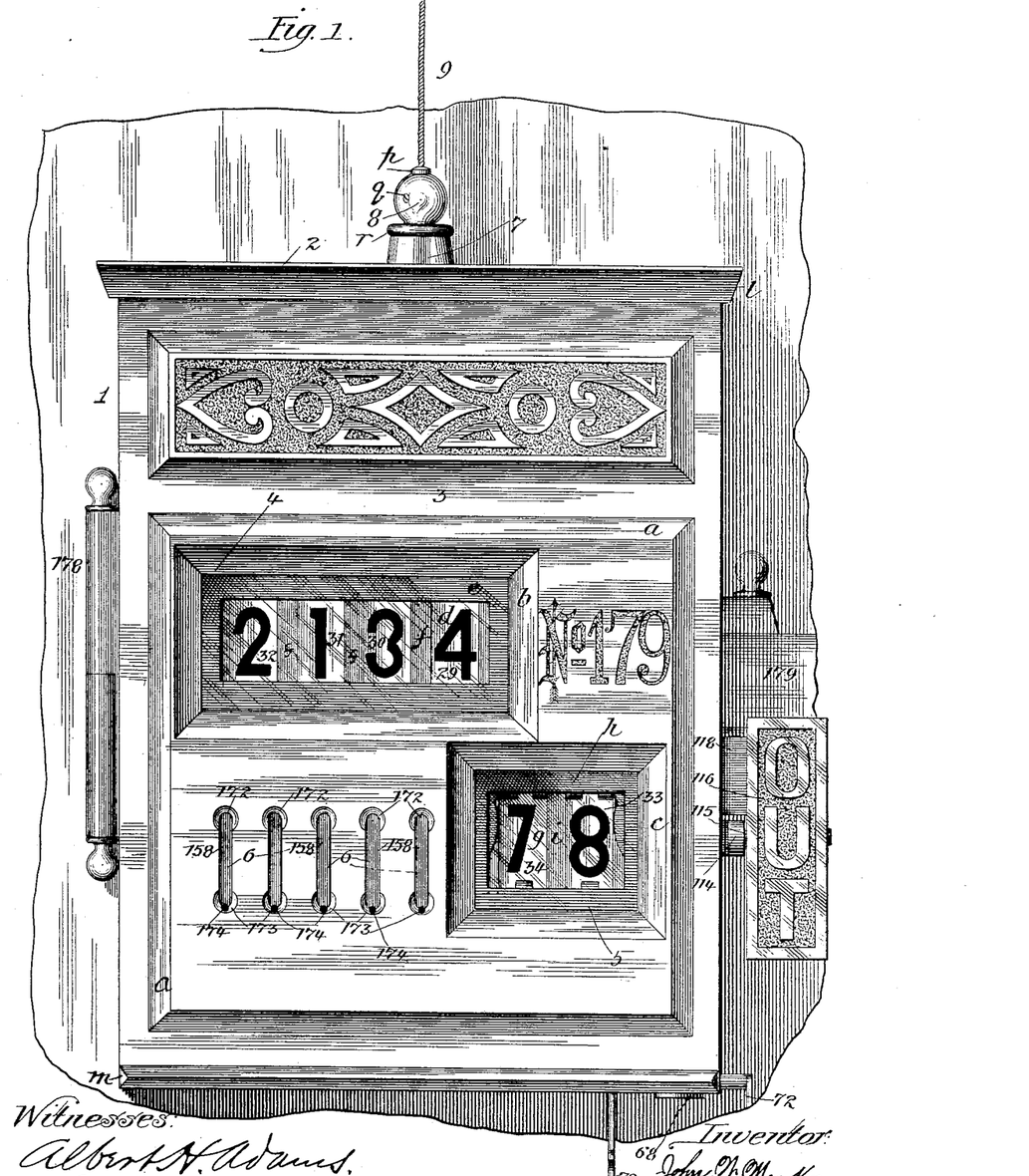
Figure 1 is a face view of the front of the register.

A bar, 114, is secured to the sliding bar 65 and extends through a slot, $u$, in the side wall of the case 1, and its end is provided with a pivot or pin, 115, on which is mounted a plate, 116, having on its faces indicating-words, as "In" and "Out," Figs. 1 and 2, to show the direction of travel of the car, and this plate, at the ends on one edge, has a groove, 117, (see Fig. 13,) to receive the end of a guide, 118, projecting out from the side wall of the case, as shown in Figs. 1 and 2, by which the plate is held against turning until withdrawn sufficient for its end to pass the guide 118, when it can be turned to expose the opposite face. This plate 116, with its slot or groove 117, is shown in cross-section in Fig. 13, and the slot 84 of the tube 66, with the incline 85 of the sliding bar 65, for operating the arm 86, is shown in Figs. 4, 6, and 18. The plate 116 can be moved without interfering with the operation of the register as a whole; but this plate, in connection with its grooves 117 and guide 118, performs the office of showing the cancelers in case of turning, unless the cancelers are held out of use by their stop-pins 102 and 103.

The main pull 10 is locked against a return or movement in either direction until a full movement in the direction started by a vibrating arm, 119, formed, as shown in Fig. 23, with notches or recesses 122 at one end and hooks 121 at the other end, the face of the bar at the end having the hooks, as shown, being cut away, as shown in Figs. 19 and 23, to permit this end of the arm to pass over the locking-pins 124 in the construction shown. This vibrating arm 119 is pivotally attached to the pull-bar 10 by a pin or pivot, 120, and the arm is held against natural drop by friction from a spring, 127, or in any other suitable manner, the spring or friction being just sufficient to hold the arm against turning naturally without interfering with the turning, as required, and so that it cannot be thrown out of position by jarring. This vibrating arm coacts with a series of pins, 123, and a series of pins, 124, on a plate, 125, attached in the construction shown to the end plate, 2, of the case by a screw or otherwise, and in use the pins 123 coact with the notches 122, and the pins 124 coact with the hook 121. The vibrating arm 119, with the pull-bar 10, when at rest, lies against a stop, 126, as shown in Figs. 3 and 20, and is brought to this position by its end striking the stop 126 and turning the vibrating arm, as shown in Fig. 20, and when the pull-bar 10 is carried to the limit of its outward movement the end of the vibrating arm strikes a stop, which may be the jam-nut $n$, turning the arm as shown in Fig. 22, and at any point intermediate between these two points the vibrating arm will engage the pins 123 or the pins 124 and lock the pull-bar 10 against a return to the point from which the start was had. The pull-bar being raised to the limit of its upward pull to advance the register-chains, the vibrating arm will stand as shown in Fig. 22, and on the return of the bar the end of this arm having the notches 122 will strike the first pin 123 and turn the arm, as shown by the dotted lines in Fig. 22, in which position if an attempt is made to draw the pull-bar 10 up one of the hooks 121 will engage with a pin, 124, and prevent the movement of the bar 10 in an upward direction, and in case the bar is returned a distance to have the end of the vibrating arm pass the pin 123 an attempt to pull the bar back will cause the notch 122 to engage the pin 123 and prevent the upward movement of the pull-bar 10, and this engagement of the hook 121 with a pin 124, or of a notch 122 with a pin 123, will occur with either one or the other at each attempt made to raise the pull-bar at any point on its return until a full return of the bar is had, when the hook end of the vibrating arm strikes the stop 126 and throws the vibrating arm into the position shown in Fig. 20. The pull-bar 10 cannot be returned after starting on its upward movement at any intermediate point in such movement, as the end of the vibrating arm 119, having the notches 122 therein, will strike the first pin 123 and throw the arm into the position shown by the dotted lines in Fig. 20, to have the hook 121 engage a pin, 124, and hold the bar 10 against return, and when the first pin has been passed an attempt to return the bar 10 will be stopped either by the engagement of a hook, 121, with a stop-pin, 124, or by the turning of the vibrating arm 119 by the hook 121 and pin 124 to throw the notched end of the vibrating arm into position for notch 122 to engage a pin, 123. It will thus be seen that the vibrating arm 119, with its notches 122 and hooks 121, in connection with the pins 123 and 124, effectually stops the return of the pull-bar at any intermediate point until the full movement has been had, and at the same time these pins allow a free movement of the bar in the direction started, as in such travel the vibrating arm stands at an incline, as shown by the full lines in Fig. 21, or at an opposite incline on the return of the bar, so that the hooks 121 pass over the pins 124, and the notches 122 pass by the pins 123; but any change in the direction of the incline will at once insure an engagement of a hook and pin or a notch and pin, by which the bar is locked against a return in the direction of the start.

The construction has the vibrating arm 119 movable with the pull-bar and the pins stationary; but it is evident that the vibrating arm might be stationary and the pins movable with the pull-bar, and the lock-pins, instead of being on a separate piece, could be secured to the casing direct, and the relation between the lock-pins and the hooks and notches is one that will allow the vibrating arm to pass the pins without engagement when standing at an incline of forty-five degrees; but when the vibrating arm is changed from this inclination the hook and pin or the notch and pin will be brought into engagement.

The frame for the register-chains on one side has secured thereto blocks 128, to which are attached a bell-chamber, 129, formed as shown in Fig. 3, and also secured to the back of the main case 1 in the construction shown. A bell, 130, is located within the bell-chamber and secured to the chamber by a screw or pin, 131, and this bell is struck by a hammer, 132, one end of which has a pin or pivot, 133, on which is a roller, 134, Figs. 7 and 8, as shown in Figs. 4 and 9, which roller runs in contact with a cam, 135, secured to the inner face of the bell-chamber at a point to have the cam act to draw back the hammer to strike the blow as the roller 134 leaves the cam 135. The hammer 132 is carried by a stem, 136, secured to a shaft, 137, around which is coiled a spring, 138, having an arm engaging with the stem 136, as shown in Figs. 7, 8, 9, and 10.

The shaft 137 has at each end a journal or pin, 139, one of which enters a bracket, 140, secured to a sliding bar, 141, in which bar the journal or pin 139 for the other end of the shaft is entered, and this bar 141 is held in place by a loop, 142, secured to the inner face of the chamber 129, and by passing through a slot cut in the end or side of the chamber, as shown in Figs. 7 and 8. The sliding bar 141 is connected by a pin, 143, Figs. 2 and 4, with the pull-bar 10, so that the movement of the pull-bar will reciprocate the sliding bar 141, and with the upward movement of this bar 141 the roller 134 will engage the face of the cam 135, drawing back the hammer 132; and when the limit of upward movement of the pull-bar 10 is reached the roller can then pass from the cam 135, allowing the spring 138 to act and strike the hammer 132 against the bell 130, sounding the alarm; but no action of the bell-hammer can be had until the bar 10 reaches the limit of its upward movement, as the cam 135, through the roller 134, holds the hammer 132 against being thrown forward, and when the blow of the hammer 132 has been struck the spring 138 acts to return the hammer to its normal position for the roller to pass back of the cam 135 and perform its work. It will thus be seen that the sounding of the alarm and the registration coact one with the other, so that until the registration is made the alarm will not be sounded, and that unless the registration is made the alarm cannot be sounded, as with a partial pull the bell-hammer is held by the cam 135, making the sounding of the alarm impossible until the cam has been passed.

The cover 3 at the end having the flange $m$ has secured to its under side ears or blocks 144, Fig. 35, supporting a pivot-wire, 145, on which, between the blocks 144, are mounted pawls or catches 146, each of which is thrown down by the action of a spring, 147, having an arm to bear against the catch and an arm to bear against the under face of the cover, and beneath these pawls or catches 146 is a lifting-plate, 148, carried by an arm, 149, pivotally supported by a pin, 150, on the end wall of the case, and this arm 149 extends down to pass the locking-screw 151 in a bar, 152, by which screw the seal 153 is held in its opening 154. The catches 146 are located on the cover 3 to be in line with an opening, 155, Figs. 30 and 36, in the end of the case, through which opening the spring-catches will pass as the cover or face-plate 3 is closed and spring down to have their ends engage with the inner face of the end wall of the opening 155, and, as shown, the cover or face-plate 3 is locked against being raised at this end by pins 157 on the flange $m$, which enter holes 156 in the end plate, 2, as shown in Figs. 27, 28, and 30.

The register is sealed after the mechanism has been secured in the case, and before the face-plate is applied, by placing a seal, 153, formed of two pieces of glass with a paper or other seal duly signed between them, in the seal-opening 154 and securing the seal in place by the screw 151, and before the screw is set down the end of the lever or arm 149 is placed behind it, so that when the screw is down it will form a lock against the movement of the arm in a direction to lift the plate 148. The cover or face-plate 3 is then slid into place for its end to pass beneath the flange $l$ and its pins 157 to enter the holes 156, and when perfectly closed the catches or pawls 146 spring down below the opening 155, through which they pass to engage the inner face of the end plate, and when so engaged the removal of the cover or face-plate is prevented until the catches are lifted, which can only be done by breaking the seal 153 and turning back the screw 151 to release the arm or lever 149, so that it can be moved to raise the plate 148 and lift the catches 146 sufficiently for their acting ends to enter and pass through the opening 155. It will thus be seen that after the cover or face-plate is in place access to the interior of the register cannot be had except by breaking the seal, and such breakage will disclose the fact that the register has been tampered with.

If it is desirable that the sight-opening for the total-register shall be closed against general observation, but capable of being seen by the proper party when desired, then this is accomplished in the construction shown by locating a plate, 158, having an extension, 159, Fig. 28, of the size to cover the sight-opening 4, with a turn or bend between them to form a shoulder, 160. As shown, the side edges of the plate are turned to form flanges 161, Figs. 27 and 31, to fit into an opening or groove, 170, formed in the cover 3, Fig. 28, to receive the plate 158, and extending across the plate 158, and secured at the end to the flanges 161, is a plate or bar, 162, in front of which, and secured to the plate 158, is a bar, 163, having therein notches 164, which stand in different planes in relation one to the other, as shown in Figs. 28 and 31.

Each notch 164 receives a spring-finger, 165, the center ones of which have a recess, 166, on each edge and the outer ones a recess, 166, on the inner edge only in the arrangement shown, and each finger 165 lies within a recess, 167, formed therefor in a bar, 168, on the plate 158, which recesses 167 are of different depths. The fingers 165 extend out from a common plate, 169, secured to the under side of the cover or face-plate 3, as shown in Figs. 27, 28, and 29, and these fingers are of a length in relation to the bar 163 that when the cover 159 is over the sight-opening 4 the ends of the spring-fingers will drop back of the lock-bar 163 and prevent any withdrawal of the covering-plate until the ends of the fingers are raised to pass into the slots 164 therefor in the lock-bar 163, and when the covering-plate 159 is drawn back to uncover the sight-opening 4 the neck of the spring-fingers 165 between the notches 166 will spring down into the recess therefor of the slots 164, locking the cover open until the spring-fingers are released by being pressed up into the wide portions of the slots 164. The spring-fingers are unlocked in either position by the use of keys 176, (shown in Figs. 25 and 26,) one of which (that shown in Fig. 25) is used for moving the sliding plate without locking it in an open position, and the other (that shown in Fig. 26) is used for moving the sliding plate and locking it in an open position, and these keys both work in connection with the slots 6 in the face-plate, and each key 176 has a series of pins, 175, corresponding in number to the number of spring-fingers 165 and of different lengths to correspond with the location of the slots 164, and these pins 175 for one key are of the same diameter; but for the other key each pin has a shoulder or enlarged portion, 177. Each slot 6 at one end has a circle, 172, of a diameter to receive the shoulders or enlarged portions 177, and the other end of each slot is formed on a smaller circle, 173, of a diameter to fit the pins without the shoulder and prevent the pins with a shoulder from passing to the limit of the slot, and the plate 158 in line with the slot 6 and with the spring-fingers 165 has a series of holes, 174, corresponding in number to the number of the slots and fingers for entering the ends of the pins 175 to operate the fingers. The exposed face of the covering-plate 159, if so desired, can have a strip, 171, Figs. 3 and 29, secured thereto, such strip having thereon such matters as may be desired or being plain, or the covering-plate can be used without such strip.

The key shown in Fig. 25 is used for moving the plate without bringing it to a position to be locked open, as in moving the plate back the shoulders 177 prevent the key from entering the small end of the slot and returning the plate to a point where the ends of the spring-fingers 165 will pass from the slots 164, the fingers resting in their respective slots; but with the key shown in Fig. 26 the pins 175, being without shoulders, can enter the small circles at the ends of the slots 6 to carry the plate 158 back for the ends of the spring-fingers to leave the slots 164 and engage with the lock-bar 163, and when this key is used to move the plate back it must also be used to advance the plate, as the pins 175, with the shoulders 177, cannot enter the holes 174 when such holes have been carried back by the key with the smaller pins to lock the sliding cover. The sliding cover when closed is locked closed by the engagement of the notches 166 of the spring-fingers with the lock-bar 163, and the fingers are released by inserting the pins of the unlocking-keys in the holes 174 to lift each finger as required to release it from engagement with the lock-bar 164. This sliding plate for the sight-opening 4, in connection with the spring-fingers shown and described, enables the sight-opening to be closed by the plate, so as to be uncovered by the use of the proper key, and the spring-fingers also act to lock the cover open, so that it cannot be closed except by the use of the proper key, so that by the same locking devices the sliding cover can be locked either closed or open, as may be desired.

The register as a whole is to be secured in any suitable manner to the car or other place used, and, as shown, a hinge, 178, is provided on one side of the case and a lock, 179, on the other side, by means of which the register as a whole can be secured in position, but is capable of removal whenever desired by releasing the lock 179 and removing the case from the hinge 178.

The operation of the several parts will be understood from the foregoing description, and the operation of the register as a whole is briefly as follows: Each upward movement of the pull-bar 10 moves the registering-chains one link at a time by the actuating-pawls for the chains, and at the end of each trip the trip-chains are reset by the bar 65, and the resetting-pawls operated therefrom, as described, such resetting in no wise affecting the total-register, and unless the chains of the trip-register are fully reset such fact will be shown by the cancelers either one or both lying across their respective chains, and with the registration of each numeral of the total-register the alarm will be sounded, and no alarm can be sounded in resetting the trip-register, as the resetting devices therefor have no connection with the alarm mechanism.

Each actuating-pawl is formed from a single piece turned at each side to form a flange, which flange is inclined from the heel toward the point in the form shown in Fig. 3, and the heel of each flange is provided with a hole to receive the pivot-wire. The units-chain pawl has its actuating end solid, and the other pawls are slotted to pass the frame-piece and have an arm to rest on the chain on either side of the pawl. This construction of frame is very simple, and at the same time the flanges render the pawl rigid, so that no bending of the pawl can occur with ordinary usage of the register, and also furnish a ready means for pivoting the pawl in position.

The vibrating arm 119 in traveling direct to the limit of the pull 10 does not stand still, but is oscillated as the ends strike the pins 123 and 124, the movement being one that will carry the hook end around its coacting pins, and by this movement the pins are cleared by the ends of the vibrating arm when the movement is not reversed.

The canceler for the tens-chain is operated by the movement of the stop-plate of the units-chain, and if an attempt should be made to reset the chains falsely by bringing the units-chain to a point where the next advance of such chain would display the cipher, the cipher being in view for the tens-chain, and these not making the advance by the resetting pull-bar 65, but doing so by the main pull 10, with the idea of having both chains show ciphers, such attempt will be unsuccessful, because the units-canceler has not been removed, and its stop-plate 87 is not against the stop-arm 96, and the plate 87 is holding up the stop-plate 93 for this canceler, which canceler is then held by the pin 103, and on the advance from the main pull both chains will move, removing the stop-pin 103 and allowing the tens-canceler to cross the chain 34, so that, although the canceler 100 is removed, the canceler 105 will be across its chain and so remain until the advance of the chain by the action of the pin 103, and this showing of the canceler 105 will indicate that the resetting operation was not made correctly.

What I claim as new, and desire to secure by Letters Patent, is—

1. The combination, with the chains of a fare-register, of a pull-bar, 10, having side arms, sliding blocks connected with said arms, a bar carried by the sliding blocks, and pawls on the bar for advancing the chains, substantially as described.

2. The combination of a pull-bar, 10, having side arms, connecting-pins 17, tapered both ways, sliding blocks 18, connected with the side arms by the pins, a supporting-bar carried by the blocks, and actuating-pawls on the bar, substantially as described.

3. The combination of a pull-bar, 10, having side arms, sliding blocks connected with the arms and tubes 20 and 21, and posts 23, affording supports and guides for the blocks, substantially as described.

4. The combination of the pull-bar 10, side arms, 11 and 12, pins 17, tapered both ways from the center, and sliding blocks 18, with the tubes 20 and 21 and posts 23, substantially as and for the purpose specified.

5. The combination, with the fare-register chains and their pivot-pins, of the plates 24, connected by transverse tubes 28, and having flanges 25 and 26, forming a trackway for the chain-pivots, substantially as described.

6. The combination, with the chains of a fare-register, of the actuating-pawls, each formed with side flanges and a perforated heel, the pivot-wire 45, passing through the heels, and the reciprocating bar carrying the pivot-wire, substantially as described.

7. The combination, with the chains of a fare-register, of reciprocating bar 47, having recesses 49, provided with inclined faces, the pivot-wire 45, carried by the bar, and chain-actuating pawls carried by the pivot-wire, substantially as described.

8. The combination, with the chains of a fare-register, of the reciprocating bar 47, having recesses 49, provided with inclined faces, the pivot-wire 45, carried by the bar, a series of actuating-pawls having side flanges and mounted on the pivot-wire, and a spring, 46, for each pawl, arranged on the pivot-wire and bearing on the bar, substantially as described.

9. The combination, with the chain-links and the pivot-pin 35 therefor, of a catch, 50, having a flange, 51, with a recess, 52, having a straight wall, 53, and a curved wall, 54, for engaging the end of the pin 35 and locking the chain against back rotation, substantially as specified.

10. The combination, with the chain-links and the pivot-pin 35 therefor, of a catch, 50, having on each side a flange, 51, with recesses 52, for engaging the end of the chain-pivot and holding the chain against back rotation, substantially as specified.

11. The combination, with the chain-links, the pivot-pin 35 therefor, the catch 50, having a flange with a notch, 52, and pivot-rod 55, of a spring, 56, and a stop-rod, 57, for holding the catch 50 engaged, substantially as described.

12. The combination, with a series of registering-chains formed of links connected by pivots 35, of a series of catches, 50, each having a side flange, 51, provided with a notch, 52, a pivot-wire, 55, common to all the catches, a spring, 56, for each catch, and a stop-wire, 57, for the springs 56, substantially as and for the purpose specified.

13. The combination, with the chain-links, the pivot-pin 35 therefor, and the main pull, of a stop-finger, 58, rock-shaft 59, and means for rocking the shaft from the main pull to release the finger, substantially as specified.

14. The combination, with the chain-links, the pivot-pin 35 therefor, and the main pull, of a stop-finger, 58, a rock-shaft, 59, an arm, 60, carrying a pin, 61, and a cam, 62, on the arm of the pull-bar for operating the stop-finger, substantially as and for the purposes specified.

15. The combination, with a series of registering-chain links, pivots 35 therefor, and the pull-bar 10, having arms, of a series of stop-fingers, 58, a rock-shaft common to all the fingers, an arm, 60, carrying a pin, 61, and a cam, 62, on an arm of the pull-bar for releasing and engaging the stop-fingers and pivots 35, substantially as and for the purpose specified.

16. The combination of the chain-links having the pivot-pins 35, the rock-shaft 59, having stop-fingers 58, and provided at one end with an arm, 60, having a cam, 63, and lateral pin 61, the pull-bars 10 and 65, a set of pawls connected with each pull-bar, and means, substantially as described, for acting on the cam and pin of the arm by the movements of the pull-bars to turn the rock-shaft and swing the fingers, substantially as described.

17. The combination, with the chain-links and the pivot-pin 35 therefor, of a pull-bar, a stop-finger, 58, rock-shaft 59, arm 60, having a cam, 63, and a cam, 64, on the pull-bar for resetting a trip-register, substantially as and for the purposes specified.

18. A rod, 59, carrying a series of stop-fingers, 58, and an arm, 60, carrying a pin, 61, and having a cam, 63, in combination with a main pull-bar provided with an arm having a cam, 62, and a resetting pull-bar having a cam, 64, for operating the stop-fingers from either pull, substantially as described.

19. The combination, with the chains, the supporting-frames 24, and the projecting pivot-pins 35, of pivoted stop-catches 50, composed of plates having notched side flanges to engage the projecting ends of the pivots, substantially as described.

20. The combination, with the chains, the supporting-frames 24, and pivot-pins 35, of the pivoted catches 50, each having notches provided with the straight face 53 and curved face 54, substantially as described.

21. The combination, with the frames 24, the chains, and the projecting pivot-pins 35, of the catches pivoted above the chains and having side flanges, 51, provided with notches having straight faces 53 and curved faces 54, substantially as described.

22. The combination, with the casing, the chains, the resetting pull-bar 65, and its pawls for resetting the trip-chains, of a slotted tube located in the casing and inclosing and forming a bearing for the said pull-bar, substantially as described.

23. The combination, with the chains of the trip-register, of the pull-bar 65, the pawl-supporting bar 77, projecting at right angles therefrom and provided with recesses 78, and the resetting-pawls 80 and 81, pivoted in said recesses of the supporting-bar, substantially as described.

24. In combination with the pull-bar 65, bearing tube 66, bar 77, provided with recesses 78, having inclined faces, and pawls 80 and 81, with the pivot-wire 82, springs 83, and the chains of a trip-register for resetting the chains, substantially as specified.

25. The combination, with the trip-chains and the canceler therefor, of the tube 66, having the slot 84, the pull-bar inclosed and guided by the tube, the plate 87, having the stop 88 and the lateral arm 86, projecting through the slot in the tube, the shaft 97, having the arm 96 and connected with the canceler, the spring 97, and the resetting-pawls connected with said pull-bar, substantially as described.

26. The combination, with the trip-chains having pins 102 and 103, the pull-bar 65, and the resetting-pawls, of the cancelers 100 and 105, the shafts 97 and 106, having arms 96 and 108, the plate 93, having the stop 94, the plate 87, having the stop 88 and arm 86, and springs 95, substantially as described.

27. The combination, with the trip-chains having pins 102 103, the tube 66, having the slot 84, the pull-bar 65, inclosed by the tube, and the resetting-pawls connected with the pull-bar, of the plate 92, carrying the pivot 90, the cancelers 100 and 105, the shafts 97 and 106, having arms 96 and 108, the pivoted plate 93, the pivoted plate 87, having the ear 110, and the arm 86, extending through the slot in the tube, and the springs 95, substantially as described.

28. The plate 87, having the ear 110, and plate 93, having the stop 94, in combination with the trip-chains, a stop-arm, 108, shaft 106, and canceler 105, for operating the canceler, substantially as specified.

29. The arm 86, plate 87, having a stop, 88, and ear 110, in combination with the cancelers, the trip-chains, and the plate 93, having the stop 94, for operating the cancelers for a trip-register chain by the movement of the arm 86, substantially as described.

30. The plates 87 and 93, each having a stop, a spring, a pivot for the plates, and a connection between the two plates, in combination with the cancelers 100 and 105, and a connection between each canceler and the stop of the plate for operating the cancelers, substantially as specified.

31. The pull-bar 65, having the incline 85, tube 66, having the slot 84, arm 86, plate 87, having the stop 88, ear 110, plate 93, having the stop 94, pivot 90, and spring 95, in combination with the stop-arms 96 and 108, shafts 97 and 106, springs 98 and 107, and cancelers 100 and 105, substantially as and for the purpose specified.

32. The combination, with the trip-chain, of a canceler movable across the chain, a shaft carrying the canceler and having a stop-arm, a pivoted swinging plate having a stop to engage the stop-arm, and a stop-pin for limiting the throw of the stop-arm when released from the stop of the pivoted plate, substantially as described.

33. The combination, with the cancelers, the trip-register chains, the resetting pull-bar for a trip-register, and an arm operated by the movement of the pull-bar, of pivoted swinging stop-plates, one engaging the other by a lip, and actuated by the arm to release the cancelers for the chains of the trip-register, substantially as specified.

34. The pull-bar 65 and bar 114, having pin or pivot 115, in combination with the cancelers, the chains, the plate 116, having the groove 117, and the guide 118, for preventing the turning of the plate without operating the canceling devices for the chains of a trip-register, substantially as specified.

35. The combination, with the chains, the actuating-pawls, and the pull-bar for moving the pawls, of the stop-pins 123 and 124, and the vibrating arm 119, pivoted on the pull-bar, and having recesses 122 at one end and hooks 121 at the other end, substantially as described.

36. The combination, with a pull-bar, 10, and a vibrating arm, 119, having hooks 121 and recesses 122, of a series of pins 123 and a series of pins 124, for locking the pull-bar against return until the full travel has been made, substantially as specified.

37. The combination, with a pull-bar, 10, and vibrating arm 119, having hooks 121 and recesses 122, of a series of pins 123 and a series of pins 124, and stops for engaging the end of the vibrating arm at the limit of the pull for turning the arm, substantially as and for the purposes specified.

38. The combination, with the pull-bar 10, of a vibrating arm, 119, having a frictional contact for holding the arm against movement by a jar, and stop-pins for engaging the vibrating arm and locking the bar against a return movement, substantially as and for the purposes specified.

39. The combination, with a bell, 130, hammer 131, cam 135, and stem 136, of a pull-bar, a sliding bar, 141, carrying the stem, and a connection between the sliding bar and the pull-bar for sounding an alarm at the completion of the registry, substantially as specified.

40. The bell 130, hammer 132, roller 134, cam 135, stem 136, and shaft 137, in combination with the spring 138, bracket 140, sliding bar 141, pin 143, and pull-bar 10, substantially as and for the purposes specified.

41. A fare-register comprising a casing having the edge opening 155, and containing numeral-bearing devices and means for operating said devices to register the fares, and provided with the seal 153, the sliding cover 3, carrying spring-pawls 147, and the pivoted lever-arm 149, extending across the seal and having the plate 148 to move the pawls, substantially as described.

42. A fare-register comprising a casing having the edge opening 155, and containing numeral-bearing devices and means for operating said devices to register the fares, and provided with the seal 153, the sliding cover 3, carrying the spring-pawls 147, the pivoted lever-arm 149, extending across the seal, the bar 152 behind the seal, and the screw 151, passing through the bar, to hold the seal and prevent the unlocking movement of the lever-arm until the seal is broken, substantially as described.

43. The combination, with a fare-register having its face-plate provided with a sight-opening and key-holes, of a vertically-sliding plate having a notched locking-bar, 163, the recessed spring-fingers 165, and the recessed bar 168, substantially as described.

44. The combination, with the casing of a fare-register having an edge opening and a frangible seal, of a sliding face-plate or cover provided with locking devices located on its inner side to engage behind the edge of the said opening, and an adjustable plate mounted on the casing and concealed behind the seal to move the locking devices into line with said edge opening, substantially as described.

45. A face-plate having a sight-opening and carrying a covering-plate for the sight-opening having a locking-bar, in combination with spring-fingers coacting with the locking-bar to lock the covering-plate in a closed or open position, substantially as specified.

46. A face-plate provided with a sight-opening and with key-slots having a larger diameter at one end than at the other, and a covering-plate carried by the face-plate and having a locking-bar, in combination with spring-fingers having notches and coacting with the locking-bars and keys having unlocking-pins of different diameters, substantially as and for the purpose specified.

47. A face-plate having an opening, in combination with a covering-plate for the opening, a locking-bar, 163, having slots 164, spring-fingers 165, having recesses 166, and support 168, having recesses 167, for locking the covering-plate either open or closed, substantially as and for the purposes specified.

JOHN W. MEAKER.

Witnesses:
ALBERT H. ADAMS,
HARRY T. JONES.